E. SWENSON.
WIRE SPLICING TOOL.
APPLICATION FILED APR. 4, 1910.

1,004,309.

Patented Sept. 26, 1911.

WITNESSES:
M. M. Carlsen.
A. E. Carlsen.

INVENTOR:
Edward Swenson.
BY his ATTORNEY:
A. M. Carlsen.

UNITED STATES PATENT OFFICE.

EDWARD SWENSON, OF BALATON, MINNESOTA.

WIRE-SPLICING TOOL.

1,004,309.  Specification of Letters Patent.  Patented Sept. 26, 1911.

Application filed April 4, 1910. Serial No. 553,329.

*To all whom it may concern:*

Be it known that I, EDWARD SWENSON, a citizen of the United States, residing at Balaton, in the county of Lyon and State of Minnesota, have invented a new and useful Wire-Splicing Tool, of which the following is a specification.

My invention relates to wire splicing tools; and the object is to provide an efficient tool for splicing not only plain wire but also barbed wire of the kind much used in fence building and which consists of two wires twisted together and provided with barbs every few inches apart.

Figure 1:
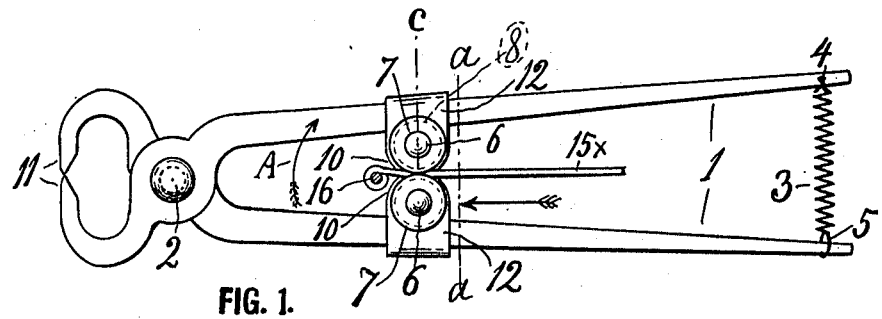
Figure 2:
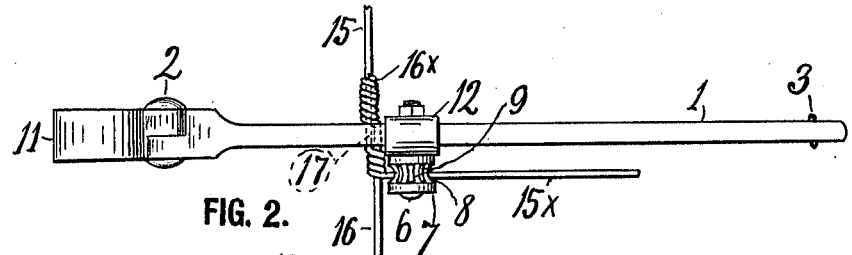
Figures 3, 5, 6:
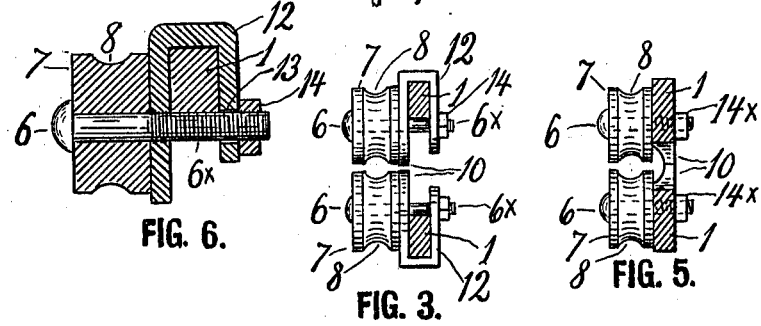
Figure 4:
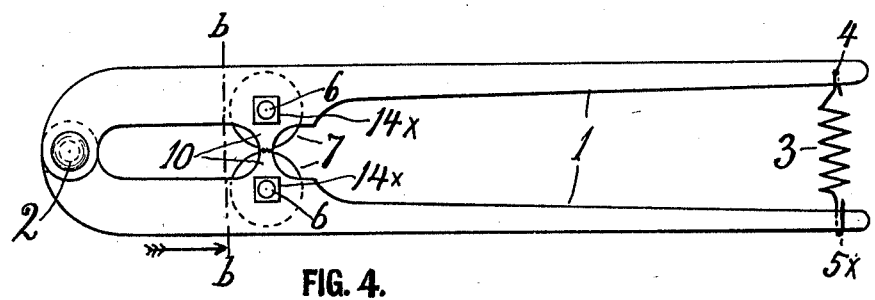

In the accompanying drawing, Figure 1 is a side view of my improved wire splicing tool as an attachment to and combined with a pair of pincers and wire in position to be spliced by the tool. Fig. 2 is a top view of Fig. 1. Fig. 3 is a section on the line $a$—$a$ in Fig. 1 with the wire gripping rollers simplified. Fig. 4 is a side view of the tool in a modified form that makes it independent of pincers or other similar tools. Fig. 5 is a cross section on the line $b$—$b$ in Fig. 4. Fig. 6 is an enlarged section on line $c$ in the upper part of Fig. 1.

Referring to the drawing by reference numerals, 1 designates a pair of levers pivoted together at 2 and having their free ends normally impelled toward each other by a contracting spring 3, which has one end attached in a hole 4 of one of the levers and its other end provided with an eye 5 or at least a hook 5× adapted to be readily engaged with and disengaged from the other lever.

Intermediate the ends of each lever, and preferably nearer the pivoted end than the free end is revolubly mounted on a headed stud or stud bolt 6 a roller 7, which is provided with a peripheric groove 8; and said groove is in Fig. 2 shown to have corrugations or cavities 9 to prevent slipping of the barbed wire when the barbs of the same pass between the rollers. Only when the tool is used to splice unbarbed wire may the grooves be without said corrugations.

10 are projections carried by the levers and adapted to contact with each other and limit the closing together of the rollers.

In Figs. 1 and 2 the levers are provided with pincer jaws 11, which are very convenient to have combined with the tool for cutting off slack fence wires preparatory to splicing them in the well known manner shown in Figs. 1 and 2, with or without inserting a piece of new wire, and where a piece of new wire is required because the slack is but slight or the wire is broken, the required pieces of new wire may be cut by said jaws, and after the splicing is done the surplus ends of the wires may be trimmed away by the jaws.

Where it is desired to simply attach the rollers to existing pincers, I provide two U-shaped clamps 12, each adapted to fit upon the lever or handle 1 of an ordinary pincer and to be tightened thereon by threading the stud bolt 6 (see Fig. 6) through the arm of the clamp nearest to the roller, so as not to pinch the roller by the head of the screw, and then pass the bolt through an unthreaded hole 13 in the arm of the clamp nearest to the nut 14, so that the nut will spring the arm inward and thus tighten the clamp on the lever. In Figs. 4 and 5 said clamps are dispensed with, and the bolt or screw is threaded directly into the lever and provided with a jam nut 14× to prevent loosening of the bolt.

The operation of the tool is easily understood by looking at Figs. 1 and 2, where the wires that are to be spliced together are designated as 15 and 16. The end of the wire 16 is shown at 16× as already wound about the wire, and the end 15× of the wire 15 is shown as inserted between the rollers 7 and partly wound about the wire 16. The wire ends to be spliced are simply placed in overlapping position as at 17 in Fig. 2 and held by any kind of tweezers, nippers or other tool, the spring 3 is then detached at one end, the levers 1 spread and then closed with either arm 15× or 16× of the wires between the rollers, the spring 3 is attached again to close the levers with a partly yielding pressure, the tool is then turned in the direction of the arrow A in Fig. 1 or in the reverse direction as may be desired until half of the splice is finished, the tool is then likewise applied to the other wire arm or end, 15× or 16×, until the other half of the splice is finished, when the tool is removed and the wire released also from the pliers or other tool holding it during the splicing process.

What I claim is:—

1. An attachment to a pair of pliers or similar tool having a pair of operating levers crossed and pivoted together at the crossing, said attachment consisting of a removable clamp secured upon each lever, each of said clamps having a stud with a roller mounted thereon; said rollers having each a peripheric groove arranged to engage at opposite sides of a wire when the levers are closed.

2. A wire-splicing tool comprising in combination two levers pivoted together near one end, a spring attached to one of the levers and detachably engaged with the other lever, a roller carried by each lever about the same distance from the pivot joint of the levers, said rollers having each a peripheric groove arranged to engage at opposite sides of a wire when the levers are closed; said mounting of the rollers involving clamping means that are detachable from the levers.

In testimony whereof I affix my signature, in presence of two witnesses.

EDWARD SWENSON.

Witnesses:
BURT I. WELD,
JOHN A. FRISVOLD.

Copies of this patent may be obtained for five cents each, by addressing the "Commissioner of Patents, Washington, D. C."